Jan. 19, 1932.  E. J. KOHLMEYER  1,842,326
PROCESS FOR DEZINCING OF ORES OR SMELTER PRODUCTS
Filed March 3, 1930
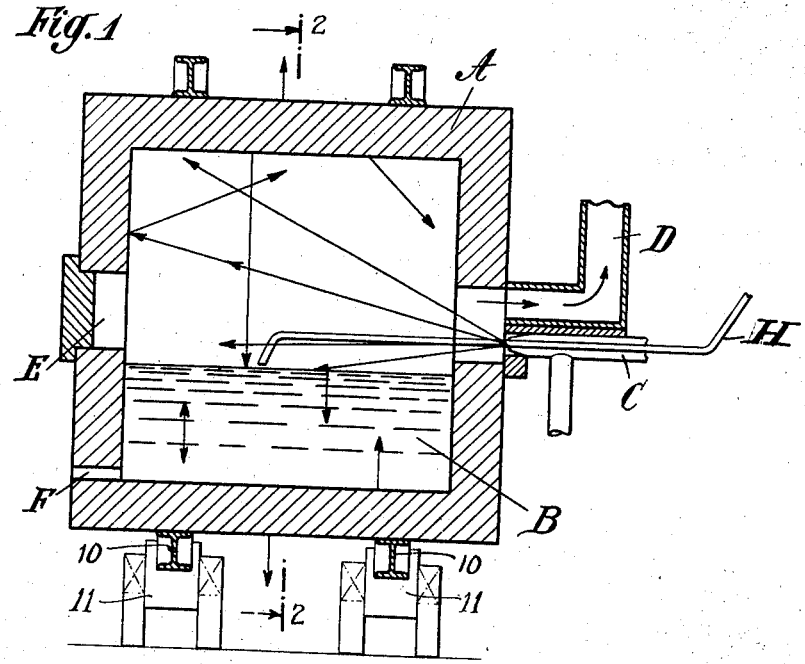
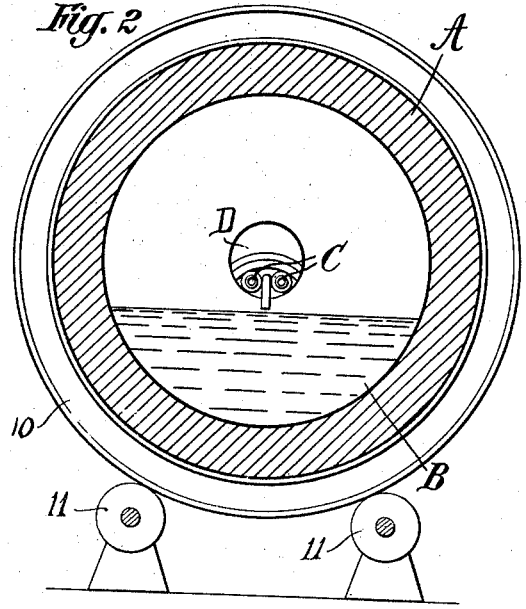
Inventor:
Ernst Justus Kohlmeyer Patented Jan. 19, 1932

1,842,326

UNITED STATES PATENT OFFICE

ERNST JUSTUS KOHLMEYER, OF BERLIN, GERMANY

PROCESS FOR DEZINCING OF ORES OR SMELTER PRODUCTS

Application filed March 3, 1930, Serial No. 432,988, and in Great Britain July 19, 1929.

In order to separate zinc-oxyde from ores, and from secondary or intermediary products several methods are known. They are based principally on the fact, that metallic zinc has at those temperatures, at which it is reduced from zinc-oxyde, a considerable vapour pressure, so that after reduction it is liberated in a state of vapour. In the presence of air or carbon-dioxyde the zinc-vapour is readily oxydized to zinc-oxyde, which is carried away by the gas-stream and which can be retained by a filtering or similar appliance.

Such a working method has for instance been proposed for the separation of zinc from liquid slags in a reverberatory furnace under addition of lime. In spite of costly experiments on a large scale it has not been possible to carry out these methods in an economical way.

A practical success however, has been obtained by another process of recovering zinc-oxyde, the so-called "Waelz process", according to which in a rotary kiln the material to be freed from zinc is treated with coal or other reducing agents at high temperatures. It is essential that in the working of this process a melting of the ore-coal-mixture does not take place, or, if this is the case at the end of the furnace, the greater part of the furnace will be passed by the materials in a solid and not completely molten state. If an ore tends to melt too easily, an adequate amount of materials, which prevents or retards the liquefaction, is added to the charge, so that a too early melting is avoided. In the case of materials with a low melting point as e. g. pyrites containing blende the stiffening agent may have to be added in such quantities that the process, so far known, becomes uneconomical.

In a third proposed method solutions of sulphides of metals, obtained from a blast furnace in a molten state are treated in a stationary crucible or furnace, from which zinc-oxyde is separated by means of air which is blown into the molten charge. This method, however, is not practical, as there is no separate continued heating provided and as the preheating of air is insufficient to keep up the temperature of combustion in the liquid sulphide melt.

The separation of zinc in a shaft furnace, again, has disadvantages, which consist in the fact, that the zones for the separation of zinc are passed too quickly to get a somewhat complete separation of the zinc.

Processes for the separation of zinc in stationary reverberatory furnaces have not led to any success as mentioned above. This is due to the unsatisfactory heat economy of reverberatory furnaces in comparison to shaft furnaces, which, as a result of the bad conductivity of heat of non-metallic materials in comparison to metals, is further diminished.

All of the mentioned disadvantages are avoided in using the present method.

In the drawings accompanying this specification I have illustrated a furnace which is adaptable for carrying out of the process, in which Figure 1 is a longitudinal sectional elevation and Figure 2 is a sectional elevation on line 2—2, Figure 1.

The drum A is lined with furnace brick and may be provided with annular rails 10 adapted to support the furnace on rolls 11. On one side of the furnace are the burners C, air injector H and flue D; on the opposite side is the charging door E and tapping hole F. It will be readily understood that the air is brought down to the surface of the molten bath B and blown on the surface thereof or a little below. The course of the flame is indicated by the arrows which illustrate the fact that it is compelled to return and leave the furnace through the flue D which is on the same side as the burners C.

The new method harmonizes with the nature of the ore and effects the separation of the zinc in a liquefied state.

It is practiced in a furnace rotating around 360 degrees and consisting of a short drum of which the diameter is about equal to the length and which is closed at one side so that the flame is compelled to return and to leave the furnace at the same side. Additions like lime etc. take only place in a very economical quantity, that means only so far as it is necessary for chemical reactions.

In the following the method is exemplified with an ore, containing e. g. 54% pyrite and 33% blende. Such an ore melts already at 1100° C. It can, therefore, be easily melted in a short drum furnace or in a short rotating kiln. After skimming unmeltable particles,—gangue—one has a molten bath of sulphides, which must be brought to the temperature of combustion. By blowing air on the surface, a vivid combustion of the sulphide sulphur takes place, which generates so much heat, that no external heating may be needed. The zinc-sulphide burns to zinc-oxyde, most of which, as a result of the heat of combustion, goes off in the form of vapour. Considerable quantities of zinc-sulphide pass off in this manner so that a mixture of ZnS and ZnO leaves the furnace, unless care for the total oxidation of ZnS is taken while leaving the furnace. The volatilization of the ZnS in the described manner is of quite another nature, as that of ZnO caused in connection with coal, by the intermediary formation of metallic zinc, does not take place. As the affinity of the iron for sulphur is greater than that of the zinc, considerable quantities of the latter are oxydized and volatilized before a notable oxydation of the iron itself takes place. Only after the zinc is volatilized to a considerable degree do iron-oxydes occur in the bath but only in a minor degree, which raises the melting point of the bath. It is known, that the melting point of iron-oxyde is considerably lowered under the formation of calcium-ferrites by the addition of relatively low quantities of lime. The melting point of pure iron-oxyde is 1565° C. whereas the calcium-meta-ferrite, $CaO.Fe_2O_3$, which contains only 26% CaO, melts, according to experiments of the applicant, already at 1202° C. By means of regularly and continually adding lime in relatively small quantities, following the formation of oxydes, one succeeds in avoiding the stiffening effect of the iron-oxydes. As the calcium-ferrites, like all slags, are able to take up a part of the formed zinc-oxyde, a small amount of coal—or, as in the case of coal dust firing, the reducing adjustment of the flame—is necessary for the driving out of the zinc-oxyde as soon as it is observed, in order to volatilize this zinc-oxyde by means of reduction. It may be stated here, that zinc is much easier to be removed out of oxyde slags and out of ferrite slags than out of silicate slags. For this reason only a small amount of coal is necessary.

The procedures just described, however, are to be looked upon as being all of secondary importance in the main, the normal course of the process should be such, that the melt remains sulphurous, that means, that ZnS burns off and that the residue consists of FeS, which is able to split off some sulphur, so that a solution of iron and iron-sulphide results. Only if the saturation point of FeS for Fe at the blowing temperature is passed the before mentioned oxydation to the iron-oxyde occurs.

The process can be interrupted as soon as a sufficient quantity of zinc, which depends on economic questions, has been volatilized. In this case, the blast smelting can be interrupted. The final product consists mainly of FeS+Fe. It is also possible, however, to continue blowing until all of the iron sulphide, including the iron, is converted into oxyde or calcium ferrite respectively, which may directly be smelted in an iron blast furnace.

Practice has shown that the process described above can effectively be accelerated, if a certain quantity of pig-iron in solid or liquid form is added to the bath. The pig-iron decomposes the zinc-sulphide contained in the raw material according to the formula: $ZnS+Fe=FeS+Zn$. The metallic zinc set free volatilizes at the temperature of the furnace, burns at the surface of the bath to zinc-oxyde and gives off at the same time a considerable amount of heat which favors the starting of the reaction. It is advisable, therefore, to make the addition of the iron at the beginning of the process. But also towards the end of the process it may be suitable to add the iron in order to bring out the remainder of the ZnS, which is still in the bath. The complete decomposition of the ZnS by means of Fe is a well known fact. This does not form, however, the essential part of the process applied for, as the addition of iron may completely be left out. The patent proposes the addition of small amounts of iron in order to start or to accelerate the volatilization of zinc. It would practically be possible, of course, to decompose the whole of this ZnS by means of metallic iron, the costs would, however, be very high. Taking an ore with 30% Fe, 26% Zn, 40% S for instance, in which the zinc is removed in the liquid state by means of iron, only ⅓ of the whole of the produced iron may be brought back into the process, in order to effect a complete separation of the zinc. For example of the 26% Zn of the ore referred to, one half of this quantity can easily be volatilized without the addition of iron. In case the remaining 13% is to be volatilized we would have the equation $$ZnS+Fe=FeS+Zn$$

then this would require

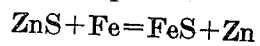

$$\frac{55.8\ Fe \times 13.0}{65.4\ Zn} = \text{approximately 11 units Fe}$$

which amounts to about ⅓ of the iron content.

Practice has shown again, that in the place of iron, iron-oxyde may be used, although in this case the reaction does not proceed so energetically. The possibility exists, however, of using iron together with iron-oxyde for the removal of the zinc out of the sulphide mixture.

The flue gases of the short drum revolving furnace consists, beside the zinc vapors, chiefly of sulphur dioxyde $SO_2$ which, after removing the zinc-oxyde, may be converted to sulfuric acid. This is possible especially due to the fact, that owing to the good quality of the short drum revolving furnace as regards its excellent heat economy, firing can be ceased and that in consequence of this the gases are not contaminated by the gases from the firing. For the method described the short drum revolving furnace mentioned above is especially well suited and the process has only been made possible by using this type of furnace, for no other furnace combines so very effectively the homogenous mixing of the melt and the most uniform heating and mixing of the whole bath. The furnace is, as mentioned, turned constantly around 360°. In comparison to the known revolving furnaces, which serve for the burning of cement, the treatment of the bauxite or for the volatilization of zinc or lead products—Waelz process,—it is of a considerable shorter length, and its diameter in comparison to its length is of great importance as the two straight sides of the short revolving furnaces assist in a very considerable degree at the heating of the melt. In the case of the long furnaces the content must not become liquid, whilst in the short revolving furnace it is, or becomes liquid. It follows, that there is a striking difference between these two types of furnaces.

The process just described serves for an example. In the same manner other sulphide ores may be decomposed, of course, as for instance copper-zinc-ores. If these ores do not contain iron, the addition of lime can be saved, as the melting point of the mixed oxydes of the ores in question is very low. In most cases copper will be found in the form of chalcopyrite, so that a mixture of the sulphides of iron, copper and zinc is to be separated. The working method is exactly the same as mentioned above. As copper has a still higher affinity for sulphur than iron it behaves like the latter, and a mixture of copper and iron sulphide may be obtained, if the process is interrupted after removing the ZnS or PbS in case either or both sulphides are present as mentioned above.

If, however, the further oxydation of the iron-sulphide is intended, the copper is oxydized in the same manner as the iron and a slag consisting of copper-calcium-ferrite is obtained. As copper oxyde diminishes the melting point of iron-oxyde in a still higher degree than lime, the amount of the lime added may be diminished or the addition of lime dispensed with. The treatment of the copper-calcium-iron-slag may be carried out in another furnace after a well known method. It is also possible, however, to sulphurate the copper after the end of the blast smelting in a short revolving furnace by means of the addition of sulphur in a certain form as for instance pyrite and to separate the copper in form of copper matte from the ferrite slag.

In a corresponding manner, as described above, the separation of ZnS may also be started and accelerated by means of raw metals or metal oxydes. In this case, however, instead of the iron, copper in form of black copper rich in iron may preferably be used.

Experiments on the subject have shown further, that also other metals as for instance bismuth, tin, antimony can similarly be volatilized from ores. An ore with 41% Fe, 46% S, 3% Sn, 2.4% Bi could be brought by volatilization to 0.12% Sn and 0.04% Bi. From one ton of the ore therefore, 28.4 kg. Sn and 23.3 kg. Bi can be obtained in form of valuable oxydes.

The product thus produced by the described process had about 68% Fe and 28% S. The iron content has increased according to the loss of volatile metals and of sulphur. The separation of sulphur may be explained by the oxydation of FeS or $FeS_2$ intermediately to $FeO.Fe_2O_3$ or $Fe_3O_4$, which oxydes afterwards are reduced to Fe (which dissolves in the remaining FeS) by a thin cover of carbon. Iron-oxyde and iron-sulphide are not soluble in each other in the liquid state but separate into two layers. The oxydes of the iron would incline to rise to the surface of the bath, where they get reduced by the coal. Experiments have shown that these reactions take place simultaneously, so that the formation of iron-oxyde can not be observed, even not for a short time, and that as the result of the process a homogeneous melt is obtained, which contains iron in a greater amount than would be due to the constitution of FeS.

The method is carried through in the following manner:

The melting of the ore may be done directly in a short rotating furnace. Heating is continued up to the inflammation temperature of the ore. Blowing of air on the surface of the liquid bath or a little below the surface respectively follows. At the same time the bath is covered with a thin layer of coal, which is renewed from time to time as the coal layer will be burnt off. The volatilized oxydes of zinc, tin, bismuth, antimony and other volatile compounds escape with the flue gases and are regained in a baghouse or an electric fume condensation system. The melt thus free from the valuable oxydes, consisting, according to the character of the ore, of iron with sulphur, iron-copper with sulphur or other metals with sulphur which are not or are difficult to be volatilized. This melt can be poured into pigs for the later recovering of the non-volatile metals or granulated, or treated directly in the liquid state.

The process just now described differs from other volatilization processes where metal-oxides are reduced by means of coal or at which metals are oxydized by means of oxygen. Contrary to processes of the latter kind the method described here has for its purpose the oxydation of sulphides of metal which generate sufficient heat as to cause volatilization.

The volatilization of antimony-sulphide represents an ideal example. In melting the latter and heating it up to the temperature of inflammation and blowing air on the surface of the molten bath one succeeds in volatilizing the antimony as oxyde entirely. This has been done on a large scale in practice in different ways. The methods formerly used had the disadvantage, however, that they required an enormous amount of heat. By practicing the method in a short rotating furnace the heat supply is greatly diminished and the process can be carried through in a much shorter time. In this described particular case the volatilization of the end product naturally is complete so that no residue remains.

In the same manner metals, or alloys, as e. g. zinc, tin, lead and others can be burnt for the purpose of gaining oxydes to be used as paints.

What I claim is:

1. Method for separating zinc from ores or intermediary products, containing metals transferable into sulphide form by means of blast smelting of the sulphides, characterized by the fact that the blast smelting is carried through by means of blowing air near the surface of the molten bath of sulphides in a short drum revolving furnace turning around 360° until the non-volatilable metals contained in the ore are oxidized.

2. Method according to claim 1, characterized the fact, that the volatilization of zinc is partly influenced by the addition of metallic iron.

3. Method according to claim 1 characterized by the fact, that the blast smelting is done under a thin cover of coal.

4. Method according to claim 1 characterized by the fact, that the lime is added in the case of formation of iron-oxide, for the purpose of making a fluid slag of calcium-ferrites.

5. Method according to claim 1 characterized by the fact, that where the materials contain copper, the oxidized copper is transformed into copper matte by the addition of pyrite.

6. Method according to claim 1 characterized by the fact that the oxides of the volatile metals are carried away by the air stream and condensed.

In testimony whereof I have affixed my signature.

ERNST JUSTUS KOHLMEYER.